June 19, 1928.
G. B. RIDLEY
1,674,064
FRUIT WASHER
Filed April 11, 1927   2 Sheets-Sheet 2
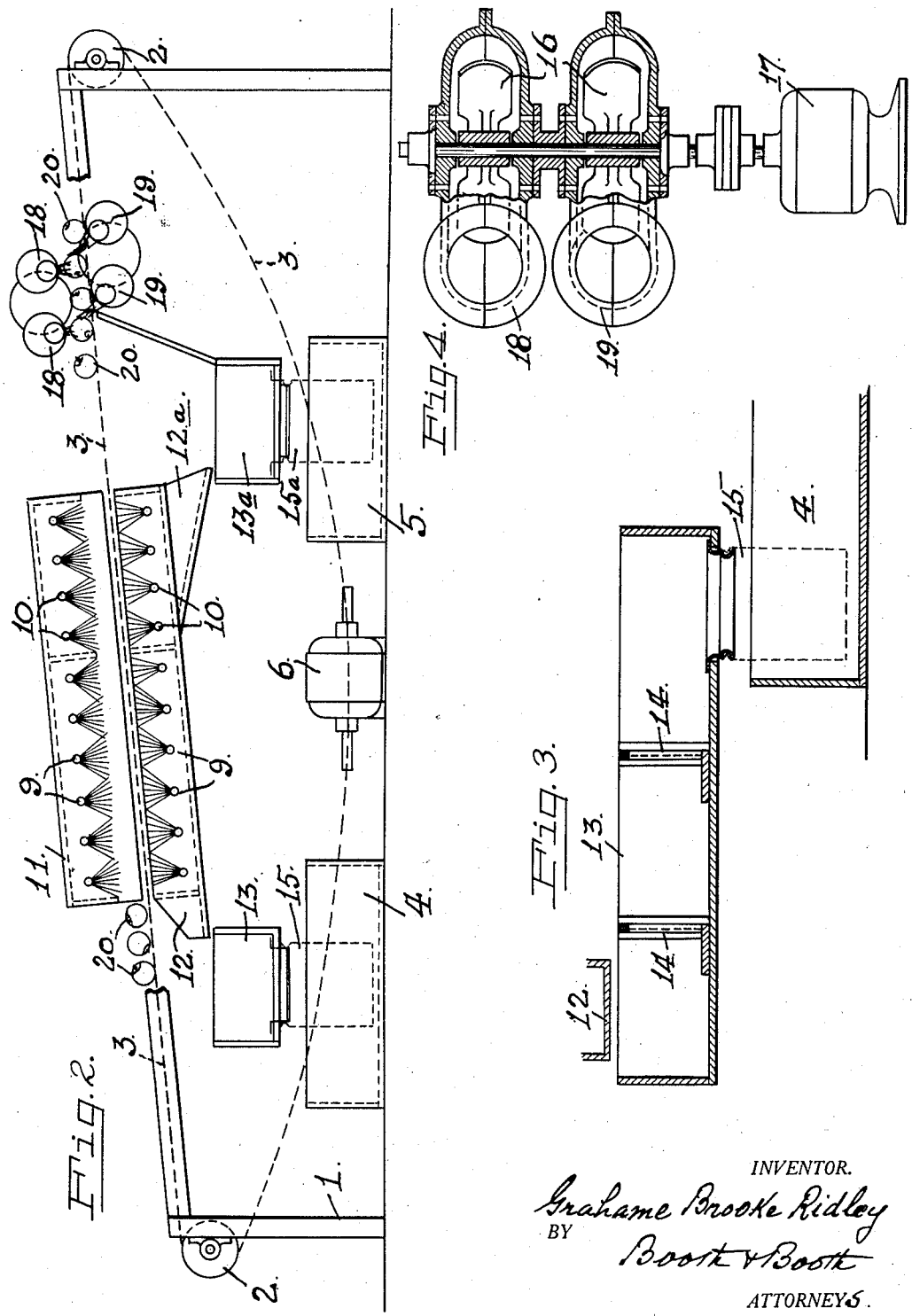
INVENTOR.
Grahame Brooke Ridley
BY
Booth & Booth
ATTORNEYS.

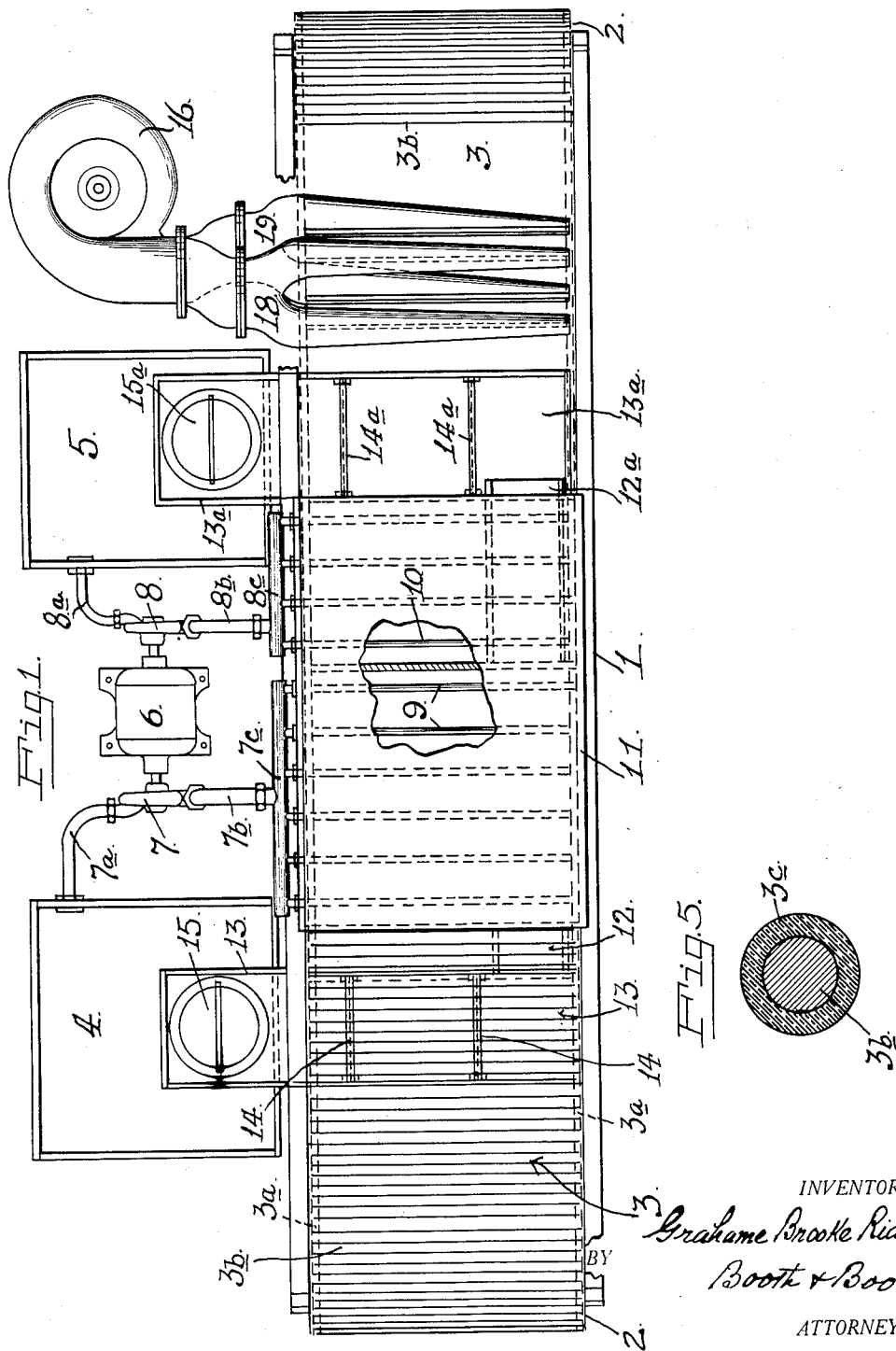

Patented June 19, 1928.

1,674,064

UNITED STATES PATENT OFFICE.

GRAHAME BROOKE RIDLEY, OF SAN FRANCISCO, CALIFORNIA, ASSIGNOR TO BEAN SPRAY PUMP CO., OF SAN JOSE, CALIFORNIA, A CORPORATION OF CALIFORNIA.

FRUIT WASHER.

Application filed April 11, 1927. Serial No. 182,931.

My invention relates to the fruit washing art. It is especially intended to comply with rules and regulations requiring the removal of lead arsenate or other spray material from the surface of fruit, particularly apples and pears. It has, however, more general application, since its essential object is to conform to modern practice in speed of operation and efficacy in result.

In a fruit washing apparatus or method comprising the initial subjection of the fruit to cleansing liquid, it is necessary to provide for a subsequent drying. This function is commonly performed by evaporation due to heated air in a zone through which the previously washed fruit passes. In order to not overheat the fruit, the drying medium is necessarily low in temperature, and evaporation is consequently slow, so that the region or zone of drying is extensive and the machine is long and cumbersome. Time is thus lost, a factor which in modern practise is of prime importance especially in the handling of large crops to prepare them for packing.

One object of my invention is to provide for the drying in the shortest possible time and space.

In washing fruit having stem or calyx cavities, or both, as, for example apples and pears, the evaporation of the relatively larger amounts of cleansing liquid collected in such depressions is slower and in practise not always complete.

Another object of my invention is to provide for the speedy and efficient drying of these cavities. Still another object of my invention is to provide a machine of relatively small dimensions, adapted for rapid and efficient work.

To these ends, my invention comprises essentially the removal of the cleansing liquid still clinging to the traveling fruit by blowing it bodily therefrom, substantially immediately, in point of time and space, after it leaves the cleansing zone. It also comprises the employment to this end, of jets of air under pressure and consequent velocity sufficient for such bodily blowing off of the liquid, said jets being adapted to reach the entire surface of the fruit including its cavities.

It also consists in the special novel arrangement of said air-jet-means, relatively to the fruit, and in novel details of construction, arrangement and combination of the machine as will hereinafter be fully described.

In the accompanying drawings, I have illustrated one form of a machine embodying my invention both as to the process involved, and the means for carrying it out, it being understood that changes may be made without departing from the spirit of the invention as defined in the claims hereunto appended.

Fig. 1 is a top plan of my fruit washer.

Fig. 2 is a side view, broken, and chiefly diagrammatic, but showing the relation of the essential members.

Fig. 3 is a sectional detail showing the double-screened box in the circulating system for the cleansing liquids.

Fig. 4 is a detail sectional view of the double fan and motor, for generating the air jets.

Fig. 5 is a cross section, enlarged, of one of the rubber-sheathed rods of the conveyer.

1 is a frame, in which are mounted terminal sprocket-rolls 2 over which passes an endless traveling conveyer 3, to which motion is imparted by any suitable drive, as for example by the inleading of power through the head roll. The conveyer 3 comprises side chains $3^a$, and cross rods $3^b$ spaced apart, said rods being sheathed in rubber coverings $3^c$, Fig. 5, said rods, by their spaced relation, providing for the necessary open-work support for the fruit, freely permeable to the several fluid agencies used; and by reason of their rubber envelopes said rods are adapted to cushion-support the fruit without injury, and also to resist the corroding effect of the fluids. At one side of the frame is a tank 4 for acid, followed by a second tank 5 for water.

6 is a motor, adapted to drive, on one side, a pump 7, the suction pipe $7^a$ of which leads from the acid tank 4, and on the other side it drives a pump 8, whose suction pipe $8^a$ leads from the water tank 5.

The delivery pipe $7^b$ from the pump 7 has a header-pipe $7^c$ which carries a plurality of spray pipes 9 in double series, the upper series transversely overlying the conveyer 3 and adapted to discharge the sprays downwardly, and the lower series transversely underlying the conveyer and adapted to spray upwardly, as shown in Fig. 2. In similar arrangement, the delivery pipe 8$^b$ from the pump 8 has a header 8$^c$ with a double series of spray pipes 10 overlying and underlying the conveyer. The spray pipe zone is boxed in by a casing 11, from one end of which leads a spout 12 which empties into a trough 13, provided, as shown in Figs. 1 and 3, with plural, separately removable, spaced screens 14, said trough discharging through a spout 15 into the acid tank 4. In like manner, the casing 11 has, at its other end, a spout 12$^a$ which empties into a trough 13$^a$ with spaced screens 14$^a$, said trough discharging through a spout 15$^a$ into the water tank 5. Thus a circulating system is provided by which the cleansing liquids may be screened and used repeatedly, the double screens permitting the removal of accumulated débris without stopping the operation.

16 is a pair of fans, driven by a motor 17, Fig. 4. One of these fans delivers to an air jet-member 18 transversely overlying the conveyer belt 3 and the other fan delivers to an air-jet member 19 underlying said conveyer crosswise. These air-jet members may be single or plural, here shown as double, and they are tapered in order to maintain constant velocity throughout their length. They lie in close proximity to and immediately succeed the water spraying zone or region. They are arranged with relation to the belt in such wise as to secure the maximum functional effect of the jets. Specifically, though not essentially, such effect is secured by so placing the upper jet member that it discharges downward at 90° to the belt, the lower jet member discharging upwardly at 45° and in a direction backwardly against the advance of the belt, the arrangement being such that both upper and lower jets are tangent to the fruit at the same time, as said fruit is leaving the center lines of the jet, and their angle of reflection, due to their meeting, is both backward and downward.

To facilitate the installation of the machine in conjunction with other equipment, already more or less standardized, it is advisable to discharge the fruit from the machine at a greater elevation than that at which it is loaded. In order to do this, the conveyer is inclined a suitable amount, so that the fruit is raised to the discharge end without being disturbed.

The process carried out in this machine is as follows:

The fruit indicated by 20 in Fig. 2 is placed upon the lower end of the conveyer, and rests lightly, by minimum contact, due to the cylindrical section of the rods 3$^b$. The cushioned surface of the rods prevents injury, to tender skin, a damage to which apples and pears are particularly liable. The special purpose for which the machine is adapted is to remove lead arsenate or other spray material from the surface of the fruit, or otherwise wash them to comply with Government restrictions relating to the maximum allowable arsenic concentration in fruit marketed fresh.

The fruit is advanced through the regions of the cleansing liquids. It first passes through the acid sprays, say, for example, dilute hydrochloric acid, and then through the rinsing water sprays. These sprays reach the fruit both from above and below. While dilute hydrochloric acid is customarily used, other cleansing liquid may be used according to circumstances; and likewise, instead of using clear water for rinsing, it may sometimes be advisable to use special solution to secure certain desirable results, such, for example, as resisting mold, or facilitating the removal of surface moisture.

Immediately upon leaving the zone of the cleansing liquid, the fruit passes through the air-jet region. In this region it is subjected to the air jets under a pressure and velocity adapted to blow off bodily the clansing liquid still clinging to it, thus drying or partially drying the fruit by the bodily, or, as it may be termed, the mechanical removal of moisture without reference and in contrast to evaporation. Thus time is saved and the machine itself may be made much shorter than if an ordinary evaporating zone were present. Also the high velocity jets reach into and as readily blow away the relatively greater volume of liquid in the cavities of the fruit, as from the other surfaces, and they will also blow out from the cavities any débris lodged therein.

The pressure required to secure the necessary velocity of the air-jets cannot, of course, be stated in exact terms. It will depend upon the nature and condition of the fruit, and of the cleansing liquids, but one can readily judge for himself by observation the most desirable pressure to blow the moisture off.

I claim:—

1. A fruit washer comprising a conveyer for advancing the fruit, means for directing surface clansing liquid sprays upon the fruit from above and below said conveyer; and means, following said cleansing liquid sprays, for drying the fruit by directing jets of air upon it from above and below the conveyer, said air being under pressure adapted to bodily blow from the fruit surface the still clinging cleansing liquid.

2. A fruit washer comprising a conveyer to receive and advance the fruit; means for directing sprays of cleansing liquid upon said fruit from above and below the conveyer; an air-jet member in position to direct its jets upon the fruit, from one side of and at right angles to the conveyer; a second air-jet member in position to direct its jets upon the fruit from the other side of and at an angle to the conveyer, said air jet members succeeding the liquid spraying means; and means for supplying said members with air under pressure to form jets of a velocity adapted to blow bodily from the fruit the still clinging cleansing liquid.

3. A fruit washer comprising a conveyer to receive and advance the fruit; means for applying surface cleansing liquid to the fruit, during its progress; and means for drying the fruit by directing upon it from above and below jets of air under a pressure adapted to bodily blow from its surface the still clinging cleansing liquid.

4. A fruit washer comprising a conveyer to receive and advance the fruit; means for applying a cleansing liquid to the fruit, during its progress; and means for directing upon the progressing fruit from above and below jets of air under a pressure adapted to bodily blow from it the still clinging cleansing liquid, the jets from one side being directed at right angles to the conveyer and those from the other side being directed at an angle to the conveyer.

In testimony whereof I have signed my name to this specification.

GRAHAME BROOKE RIDLEY.